(12) United States Patent
Leo et al.

(10) Patent No.: US 10,442,590 B2
(45) Date of Patent: Oct. 15, 2019

(54) CONTAINER FILTRATION SYSTEMS

(71) Applicant: Rubbermaid Commercial Products LLC, Atlanta, GA (US)

(72) Inventors: Mike Leo, Salisbury, NC (US); Michael A. Zarkis, Tega City, SC (US); Marcel Souza, Kalamazoo, MI (US); Robert Bradley, Granger, IN (US); Brian Smallwood, Huntersville, NC (US)

(73) Assignee: Rubbermaid Commercial Products LLC, Atlanta, GA (US)

( * ) Notice: Subject to any disclaimer, the term of this patent is extended or adjusted under 35 U.S.C. 154(b) by 50 days.

(21) Appl. No.: 15/949,659

(22) Filed: Apr. 10, 2018

(65) Prior Publication Data

US 2019/0062011 A1   Feb. 28, 2019

Related U.S. Application Data

(60) Provisional application No. 62/549,784, filed on Aug. 24, 2017.

(51) Int. Cl.
*B65D 51/16* (2006.01)
*B65D 81/26* (2006.01)
(Continued)

(52) U.S. Cl.
CPC .......... *B65D 51/1616* (2013.01); *A47J 47/10* (2013.01); *B65D 21/0222* (2013.01); *B65D 21/0233* (2013.01); *B65D 43/022* (2013.01); *B65D 51/244* (2013.01); *B65D 81/2076* (2013.01); *B65D 81/261* (2013.01);
(Continued)

(58) Field of Classification Search
CPC ............ B65D 51/1616; B65D 51/1605; B65D 51/16; B65D 51/244; B65D 51/24; B65D 43/022; B65D 43/0214; B65D 43/0202; B65D 21/0222; B65D 21/0217; B65D 21/0233; B65D 21/0219; B65D 21/0223; B65D 81/2076; B65D 81/2069; B65D 81/20; B65D 81/261; B65D 81/266; B65D 81/26; A61B 50/00
USPC ..... 220/371, 367.1, 378, 373; 206/509, 508, 206/439; 442/72, 71; 96/12, 11; 137/171, 589, 583
See application file for complete search history.

(56) References Cited

U.S. PATENT DOCUMENTS

| 5,324,489 A | * | 6/1994 | Nichols | ...................... A61L 2/26 206/363 |
| 6,715,628 B1 | * | 4/2004 | Nichols | ...................... A61L 2/26 220/256.1 |

(Continued)

FOREIGN PATENT DOCUMENTS

CH          681221 A5  *  2/1993      ................ B65F 1/16

*Primary Examiner* — Robert J Hicks
(74) *Attorney, Agent, or Firm* — Eversheds Sutherland (US) LLP (57) ABSTRACT

Storage containers and lids for such containers are provided. The lid has a first lid face and a second lid face. The second lid face has a rim configured to attach the lid to a storage bin. On the first lid face and extending to the second lid face is a plurality of apertures to provide airflow through the lid. A seal material extends from the second lid face that is configured to make the airflow path selectively sealable at a continuous wall and closed surface of a corresponding storage bin.

20 Claims, 8 Drawing Sheets

(51) Int. Cl.
  *A47J 47/10*  (2006.01)
  *B65D 21/02*  (2006.01)
  *B65D 81/20*  (2006.01)
  *B65D 43/02*  (2006.01)
  *B65D 51/24*  (2006.01)

(52) U.S. Cl.
  CPC .. B65D 81/266 (2013.01); *B65D 2543/00175* (2013.01); *B65D 2543/00296* (2013.01); *B65D 2543/00518* (2013.01); *B65D 2543/00842* (2013.01); *B65D 2543/00972* (2013.01)

(56) References Cited

U.S. PATENT DOCUMENTS

| | | | |
|---|---|---|---|
| 7,772,139 B2 | 8/2010 | Chandra | |
| 2004/0256270 A1* | 12/2004 | Gleichauf | A61L 2/022 206/439 |
| 2005/0194387 A1* | 9/2005 | Banks | A61L 2/26 220/371 |

* cited by examiner

CONTAINER FILTRATION SYSTEMS

CROSS-REFERENCE TO RELATED APPLICATIONS

This application claims priority benefit of U.S. Provisional Application No. 62/549,784, filed on Aug. 24, 2017, which is incorporated by reference herein in its entirety.

BACKGROUND

The present disclosure relates generally to storage containers, and relates more particularly to storage containers for food products, such as produce.

Storage containers are useful for organizing and storing away various items for later consumption or use. For example, storage containers are often used to store foods that can be used in a later meal, which helps to save food costs for a family or a business. Prolonging the shelf life of food also helps to reduce food waste. Thus, the longer food can be stored without spoiling, the better for businesses, families, and the environment.

SUMMARY

In one aspect, a lid for a storage container is provided, including a first lid face and an opposed second lid face. The lid has a plurality of apertures that extend between the first lid face and the second lid face. The plurality of apertures provide an airflow path through the lid. A seal material is also disposed on and extends from the second lid face.

In another aspect, a container system is provided, including a storage bin with a floor, a continuous closed surface, and at least one sidewall. The storage bin further includes an open top portion surrounded by a rim. The container system also has a lid with a plurality of apertures for airflow through the lid. A seal material is disposed on and extends from the surface of the lid.

In yet another aspect, a container system kit is provided, including a lid with a first face and a opposed second face. The second lid face has a rim for attaching the lid to the storage bin. The container system kit also contains a first storage bin and a second storage bin. The first storage bin has a volume smaller than the second storage bin volume. Each storage bin has a closed interior, an open end, a closed end, and at least one sidewall. Additionally, the at least one sidewall of the storage bins define a continuous closed surface.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

The present disclosure provides storage containers for preserving the longevity of food. For example, the longevity of food can be promoted through the regulation of moisture and air. Different sized containers call for different regulations of the conditions within a storage container. For example, a large container may require greater airflow than a smaller container.

Disclosed herein are lids and storage containers for use as a container filtration system in which a single lid is adaptable to storage containers (also referred to as "storage bins" herein) of varying size. The lids may help to regulate airflow within the container system. Additionally, the storage bins of the container filtration system may help to prevent food from resting within settled liquids. Together, the lid and the storage bins may prolong food spoilage.

Various storage bin designs are known in the art and may be used or adapted for use in the container systems described herein.

Storage Bin

Storage bins are provided herein. In certain embodiments, the storage bin is configured to contain or organize goods stored within the bin and to promote regulation of moisture settled within the bin. As used herein, the terms "storage bin" and "bin" refer to the containment volume portion of the container filtration system, which is separate from the lid later described.

Figure 1:
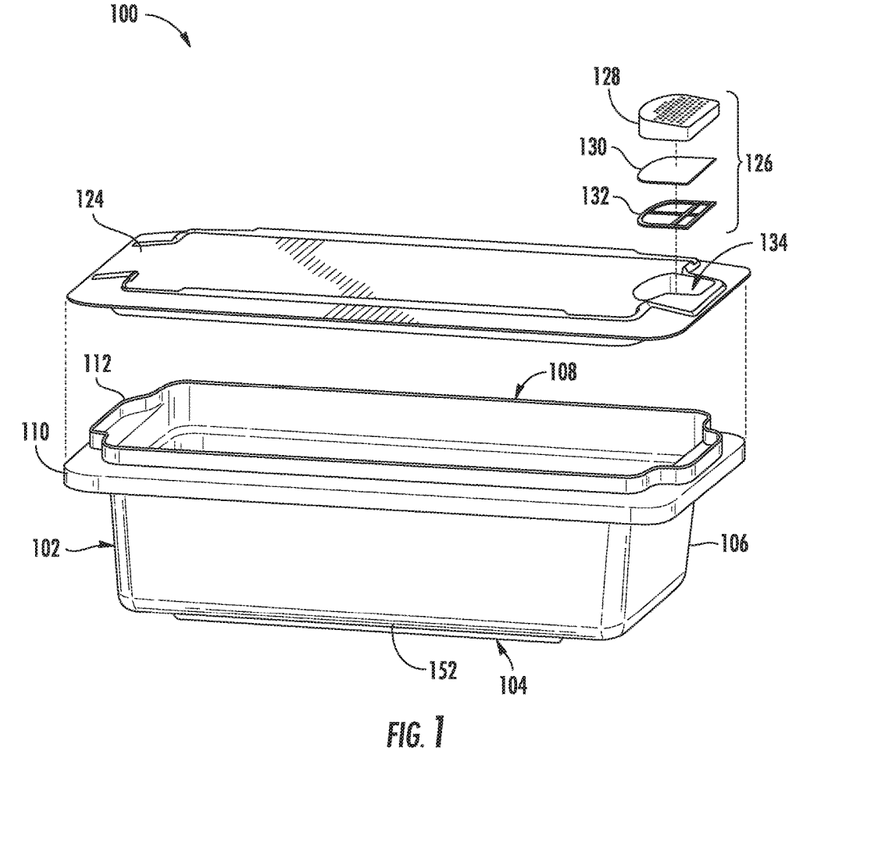
FIG. 1 is an exploded view of one embodiment of a container filtration system.

In certain embodiments, as shown in FIG. 1, a storage bin 102 is configured to hold goods within a confined space. For example, the storage bin 102 may include an enclosure defined by a floor 104 and at least one sidewall 106 extending from the floor 104 to define an open top portion 108 to receive goods therethrough. As used herein, the terms "floor" and "enclosed floor" refer to the structure or panel opposite the open top portion 108 of the storage bin 102. In one embodiment, as shown in FIG. 1, each sidewall of the storage bin 102 is substantially rectangular. In other embodiments, the wall or walls of the storage bin 102 may be of a different shape such as square, trapezoidal, triangular, or another polygonal shape. For example, the storage bin 102 may have a volume ranging from 0.5 gallons to about 50 gallons. In some embodiments, the storage bin has a single sidewall that forms a circular, oval, or elliptical profile.

In some embodiments, the storage bin 102 has a volume of 8.5 gallons. In other embodiments, the storage bin 102 has a volume of 3.5, 5, 8.5, or 12.5 gallons. The storage bins may have a range of suitable volumes for variously sized lids. In a kit containing various storage bins, each storage bin 102 floor 104 may have a similar area but may have sidewalls 106 extending from the enclosed floor 104 in various heights, to provide bins having similar footprints but varying volumes. That is, a single lid may be designed to mate with storage bins having a variety of volumes.

In some embodiments, as in FIG. 1, the container filtration system 100 has at least one male detent 152 disposed along an outer surface of the floor 104. The lid 124 of the filtration container system 100 may have one or more female detents (not illustrated) configured to receive the male detents 152, such that the lid may be selectively attached to the face of the storage bin, such as for compact storage of one or more empty storage bins and their lid. For example, the container filtration system 100 may be able to stack onto other container filtration systems. Additionally, the detents of the floor or the lid may be configured to allow stacking of the same component (e.g., a plurality of storage bins) to save space. For example, the male detents 152 of the enclosed floor 104 may snuggly fit within male detents of another storage bin's floor that is stacked within the container.

Figure 9A:
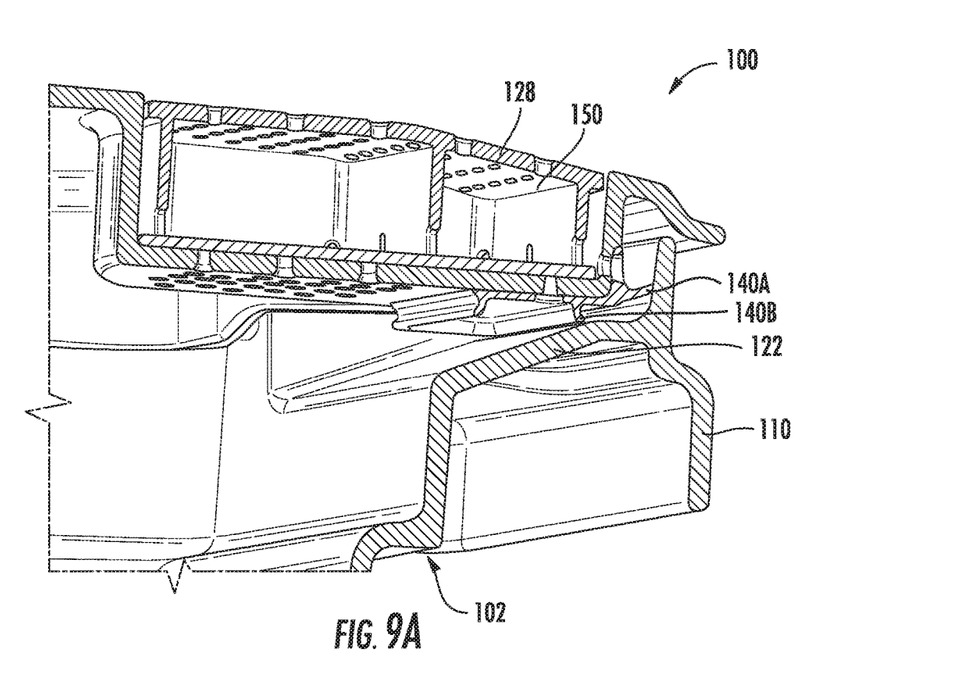
FIG. 9A is a partial perspective cross-sectional view of one embodiment of the container filtration system of FIG. 1.
Figure 9B:
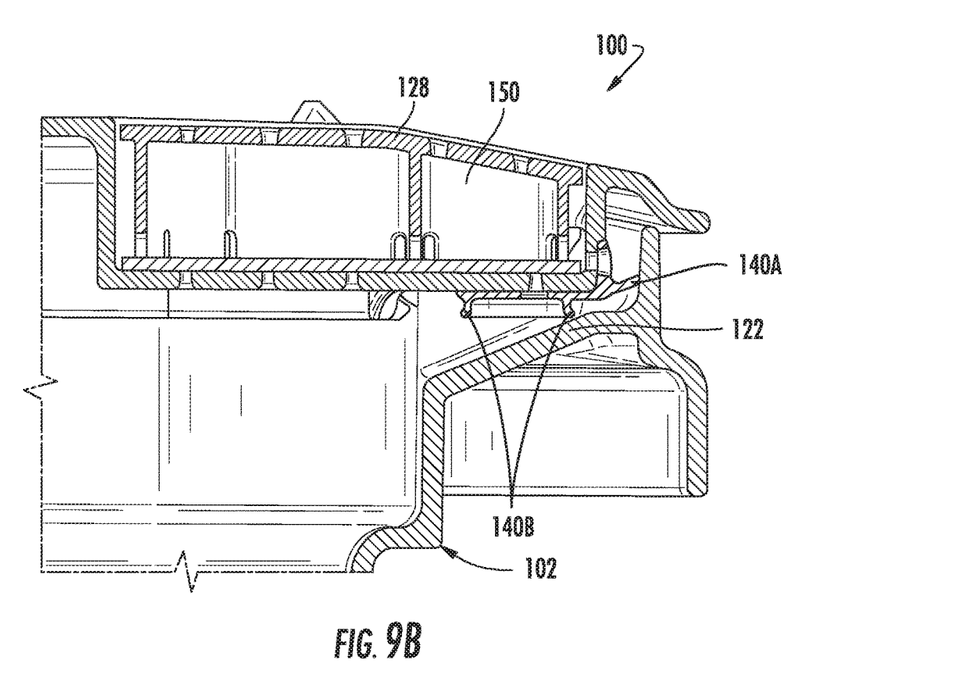
FIG. 9B is a partial cross-sectional view of one embodiment of the container filtration system of FIG. 1.

In certain embodiments, as in FIG. 1, the storage bin 102 has an overhang 110 that protrudes away from the sidewall 106. As used herein, the words "overhang" and "shelf" are interchangeable and refer to a surface that extends or projects from an outer sidewall surface of the storage bin 102. In some embodiments, the overhang 110 generally forms a "u-shape" with the at least one sidewall 106 (as seen in FIGS. 9A and 9B). For example, a u-shaped overhang 110 may be suitable as a handle for carrying the storage bin 102. The overhang may form another shape suitable for carrying the storage bin or for stacking. For example, a similarly shaped storage bin 102 with a similar overhang 110 may allow for a plurality of bins to nest for stacking. In certain embodiments, the storage bin 102 has other ridges and grooves in the at least one sidewall 106 to fit various products or be adapted for fitting varying accessories. For example, some ridges may be configured to set a grill or other raised platform within the storage bin 102 to create different leveled surfaces within the storage bin 102.

As shown in FIG. 1, in certain embodiments the storage bin 102 has a rim 112 configured to mate with a lid to form a sealed container. In some embodiments, the rim 112 is configured to attach to a lid, as discussed later. In some embodiments, the rim 112 protrudes from an upper surface of the storage bin 102, such as from the overhang 110. For example, the rim 112 may project from the perimeter of the overhang 110 of the storage bin 102. Alternatively, the rim 112 may project from the sidewall 106 or be continuous with the sidewall 106. In some embodiments, as shown in FIG. 1, the rim 112 is substantially oblong with rounded corners and substantially straightened sides. The rim 112 may form a variety of shapes depending on the perimeter shape of the overhang 110 and/or the sidewall 106. In other embodiments, the rim 112 may be formed from multiple walls or suitable shapes configured to form a tight seal with a lid.

Figure 2A:
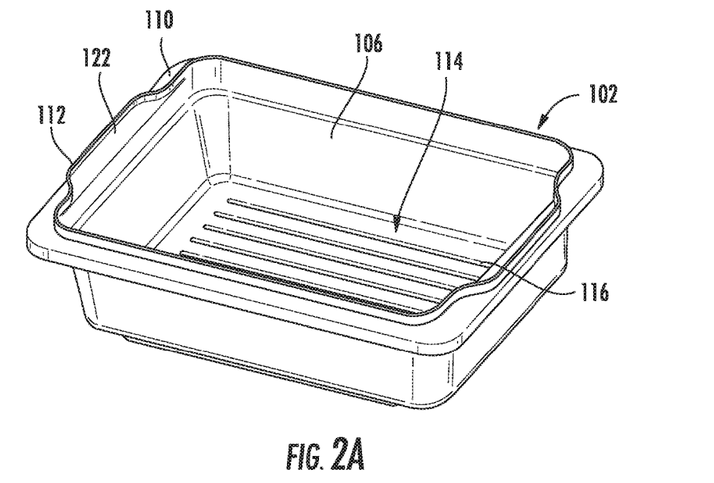
FIG. 2A is a perspective view of one embodiment of a storage bin of the container filtration system of FIG. 1.
Figure 2B:
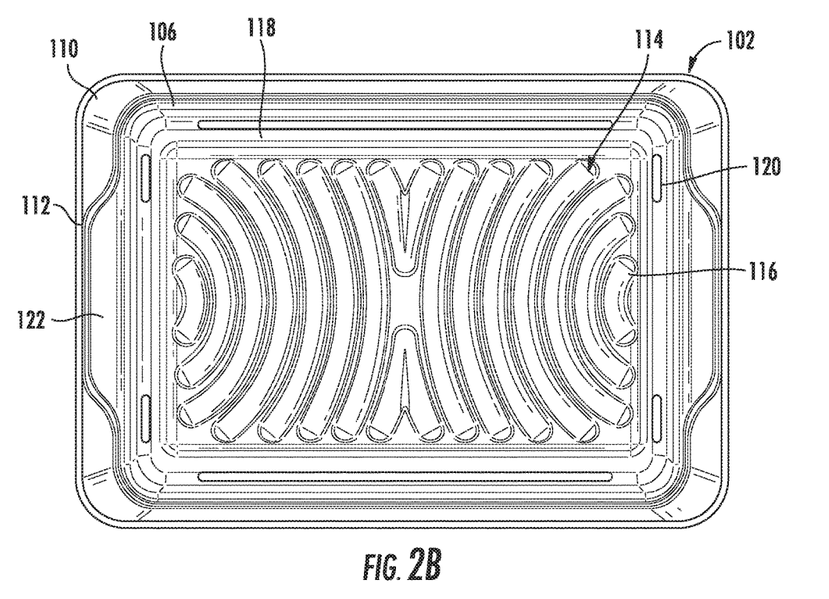
FIG. 2B is a top view of another embodiment of a storage bin of the container filtration system FIG. 1.

In certain embodiments, as shown in FIGS. 2A and 2B, the storage bin 102 has a floor 114 that at least partially defines the enclosed volume of the bin. For example, the floor 114 may have a series of ridges 116 that protrude to form channels between each ridge. Each ridge 116 in a series of ridges may be of similar shape and size, or each ridge may be of a different shape and size. For example, ridges 116 may be of an arcuate shape. For example, as shown in FIG. 2B, the series of ridges 116 are mostly c-shaped or arcuate, but two v-shaped ridges are centrally disposed between the c-shaped ridges. The floor 114 may have a series of channels, such as those defined by ridges 116 and configured to divert liquid that contacts the floor 114 toward the at least one sidewall 106. For example, the floor 114 may be raised in the center to create an angled surface toward the at least one sidewall 106. In other instances, the floor may be flat. In other embodiments, as in FIG. 2A, the series of ridges 116 are substantially straight and parallel to one another. Each series of ridges may provide the benefit of lifting items out of settled liquid in the storage bin 102. For example, having a floor 114 as in FIG. 2B may be beneficial to lift produce having a thin or elongated profile out of settled liquids.

In some instances, surrounding the series of ridges 116 and within the at least one sidewall 106 of the storage bin 102 is a peripheral channel 118. For example, the peripheral channel 118 may define the lowest elevation of the floor 114. In some embodiments, the peripheral channel 118 has a series of female detents 120. For example, the female detents 120 may protrude in a direction opposite the series of ridges 116 in the floor 114. The female detents 120 may be configured to receive similarly situated detents from a storage bin 102 of the same shape and size, such as for nesting/stacking.

In certain embodiments, as shown in FIGS. 2A and 2B, the rim 112 forms a continuous closed surface 122. The phrase "continuous closed surface" as used herein, refers to a wall or panel face, or portion thereof, that is continuously impenetrable (i.e., solid) over its area. In FIGS. 2A and 2B, the continuous closed surface 122 is substantially parallel to the floor 114. In other embodiments, as shown in FIGS. 9A and 9B, the continuous closed surface 122 is not parallel with the floor 114. For example, the continuous closed surface 122 may be angled at an acute angle measured parallel with the floor 114. In certain embodiments, the angle is 25 degrees. In some embodiments, the angle may range between 1 to 89 degrees.

Lid

In certain embodiments, as shown in FIG. 1, the container filtration system 100 includes a lid 124. The lid 124 may be configured to fit the previously discussed storage bin 102, among others.

Figure 3A:
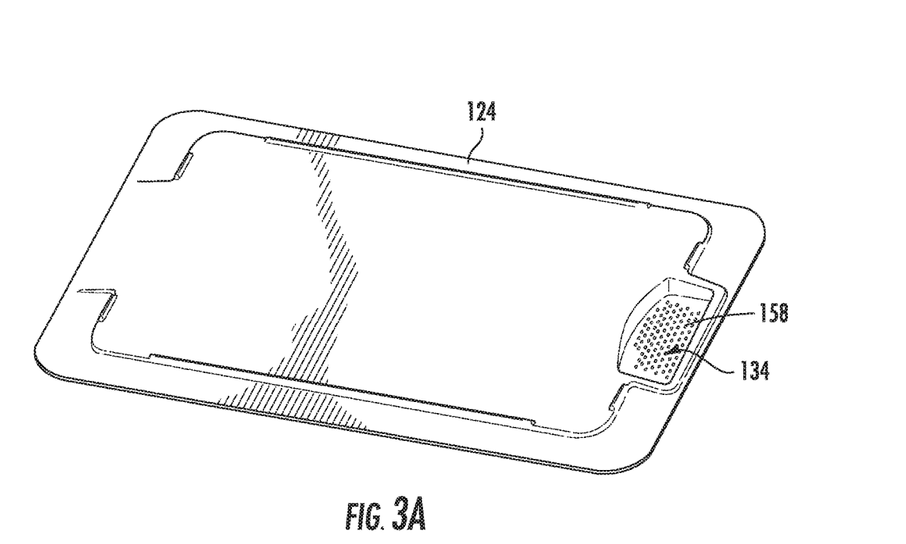
FIG. 3A is a perspective top view of one embodiment of a lid of the container filtration system of FIG. 1.
Figure 3B:
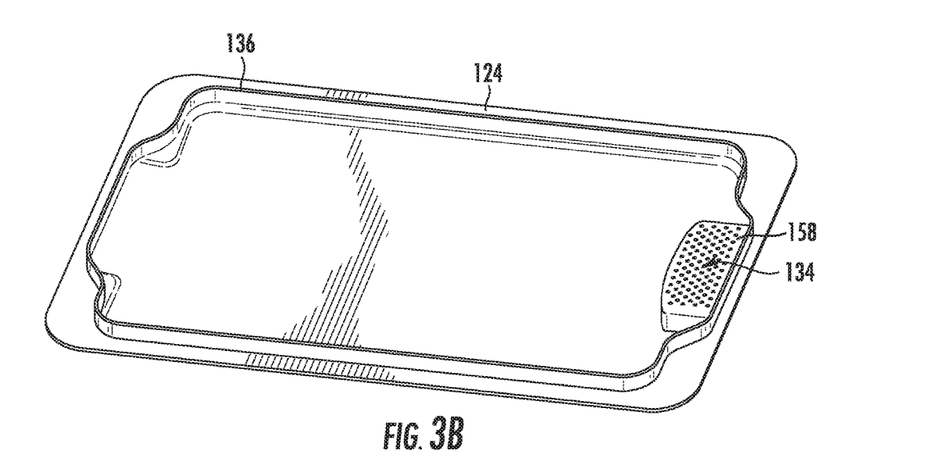
FIG. 3B is a perspective bottom view of the lid of FIG. 3A.

In certain embodiments, as shown in FIG. 3A, the lid 124 is substantially rectangular. For example, the lid may be a scaled shape similar to the open top portion of the storage bin. In other embodiments, the lid 124 may be another suitable shape. The lid 124 may or may not be substantially flat and may have a raised portion or a hollowed interior. In some embodiments, the lid 124 may have a first lid face as seen in FIG. 3A and a second opposed lid face as seen in FIG. 3B. The raised portion, as shown in FIG. 3A, may help to stack other container filtration systems or storage bins thereof on top of the lid 124.

In certain embodiments, as shown in FIG. 3A-FIG. 6, a plurality of apertures 134 are disposed over at least a portion of the lid 124. The plurality of apertures 134 extend through the lid 124 to provide an airflow path through the lid 124 and into the storage bin 102. For example, the lid 124 may be securely attached to the storage bin 102 and the apertures 134 may be the only opening(s) from the external environment into the storage bin 102. The plurality of apertures 134 may include two or more apertures. The number of apertures may correlate to the amount of air to be regulated within the container filtration system 100. For example, the more open apertures 134 through the lid 124, the more airflow the lid 124 allows to pass into the storage bin 102. Conversely, the fewer open apertures 134, the less airflow into the container filtration system 100. As discussed above, depending on the type of food or other stored good, increased or decreased airflow into the storage bin may be desired. Thus, as will be discussed in greater detail below, a particular storage bin may be selected based on its design for impeding some, all, or no airflow through the lid, given the particular use.

Furthermore, the lid 124 may have a filter system 126 that has a filter cap 128, filter 130, and gasket 132. For example, the filter system 126 may sit within an indented region 134 of the lid 124. The filter system 126, in some instances, could be a flat and integral part of the lid instead of separate components. It should be understood the filter system helps not only to regulate air flow, but also diverts any liquids that seep into the filter cap 128 out of the indented region 134 through apertures. The filter 130 may be configured to regulate oxygen and carbon dioxide. The filter 130 may be configured to slow the flow of air between the interior and the exterior of the lid 124. The filter 130 may be configured to absorb oxygen or carbon dioxide.

Figure 5:
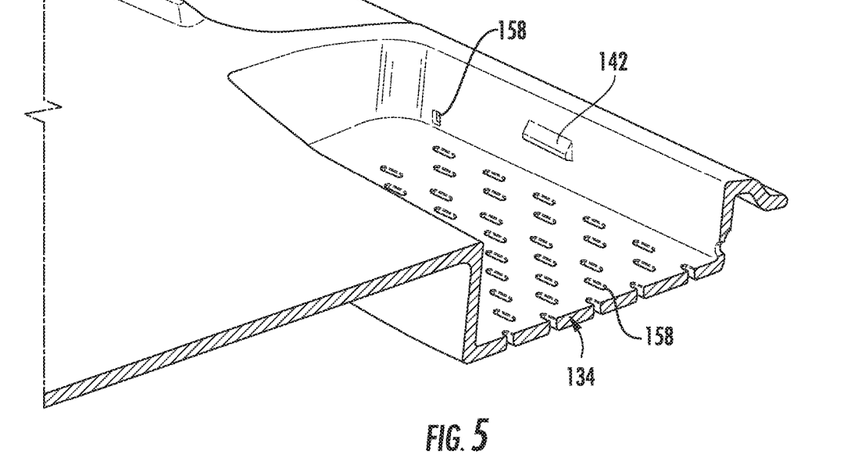
FIG. 5 is a cross-sectional perspective view the indented region of the lid of FIG. 3A.

In certain embodiments, as shown in FIG. 3A, the lid 124 may have an indented region 134. For example, the indented region 134 may project away from one of the surfaces of the lid 124. In some embodiments, the indented region 134 may be formed from a series of walls where at least one of the walls contains the plurality of apertures 158. For example, the indented region 134 may contain the plurality of apertures lined in rows and columns to form a pattern on at least one of the walls. The apertures 158 may be located on more than one wall (as shown in FIG. 5). In certain embodiments, the lid 124 may have multiple indented regions. For example, the lid 124 may have an indented region 134 on each side or multiple on a single side.

In some embodiments, as shown in FIG. 3B, the lid 124 may have a wall (or "rim") 136 protruding from the lid 124. The wall 136 may be configured to align with the rim 112 on the storage bin 102 shown in FIG. 2A. For example, the wall 136 of the lid and the rim 112 of the storage bin 102 may snuggly slide onto one another to form an enclosed area within the storage bin 102.

Figure 4A:
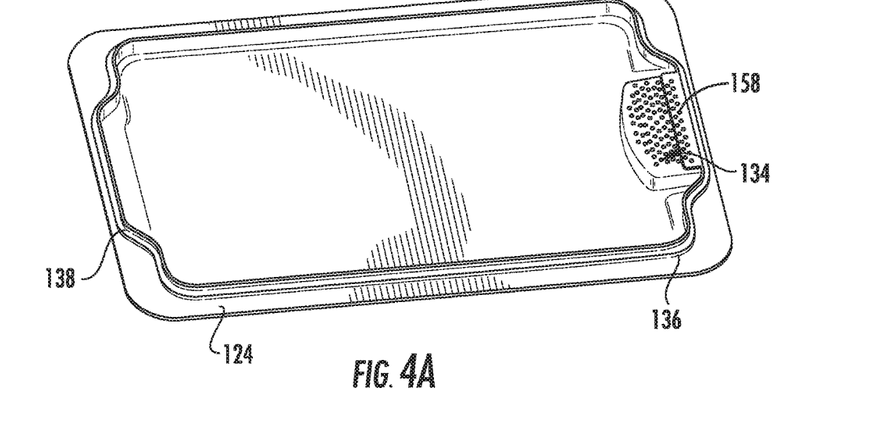
FIG. 4A is a perspective bottom view of the lid of FIG. 3A with a sealing material.
Figure 4B:
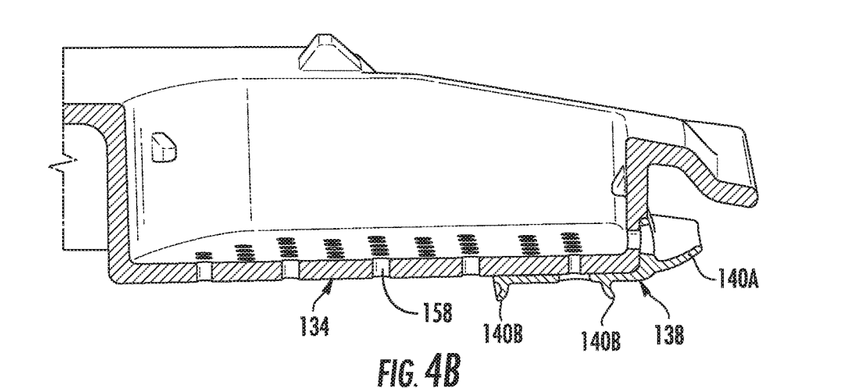
FIG. 4B is a cross-sectional view of the indented region of the lid of FIG. 3A.

In some embodiments, the wall 136 may be or be associated with a seal 138 configured to securely fasten the lid 124 to the storage bin. As shown in FIG. 4A, a seal 138 may extend along one side of the wall 136 of the lid 124. For example, the seal 138 may cover a portion of the wall 136 to create an air and/or liquid-tight seal between the lid 124 and the storage bin. In certain embodiments, as in FIG. 4B, the seal 138 has multiple lips 140A, 140B that apply pressure against other surfaces. The lip 140A of the seal 138 may be a "wiper fin" that may or may not create a liquid-tight pressure against the wall of the storage bin, sealing the container. For example, the first lip 140A may press against the rim 112 of the storage bin 102. In some embodiments, the seal 138 also partially covers the indented region 134. The seal 138 may be disposed on and extend from the second lid face only on the indented region. For example, the seal 138 may lie flat on the indented region 134 to form an elevated surface.

The seal 138 may define a continuous wall 140B surrounding a portion of the plurality of apertures on the indented region 134. In other embodiments, the continuous wall 140B may be separate from any seal for securing the lid on the storage bin. That is, in certain embodiments, the lid includes a continuous wall 140B and may include no other seal material or may include a seal material that is detached from the continuous wall 140B. For example, the seal 138 may be configured to restrict airflow through some or all of the apertures in the lid when the continuous wall 140B is pressed against a continuous surface, such as a continuous surface of the storage bin, as described herein. In some embodiments, the seal 138 may have a continuous wall 140B around the edges where the seal 138 covers the indented region 134. In some embodiments, the seal 138 has a plurality of apertures to match and align with the indented region 134.

Figure 7A:
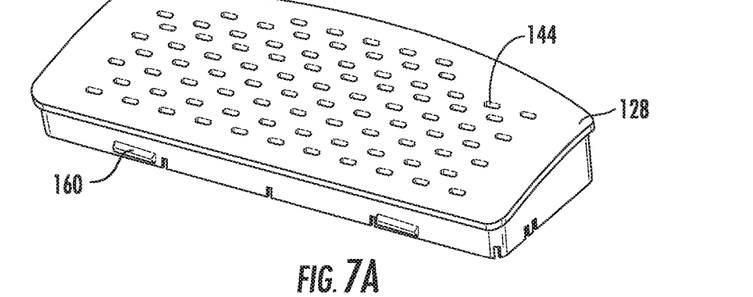
FIG. 7A is a top perspective view of one embodiment of a filter cap of the container filtration system of FIG. 1.
Figure 7B:
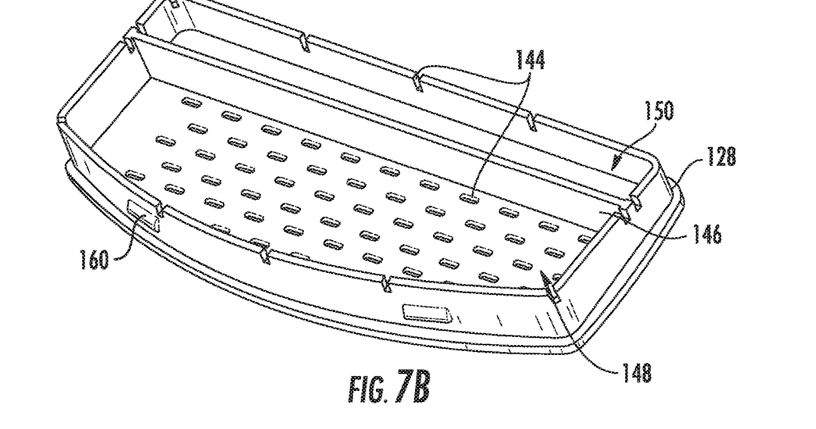
FIG. 7B is a bottom perspective view of the filter cap of FIG. 7A.
Figure 7C:
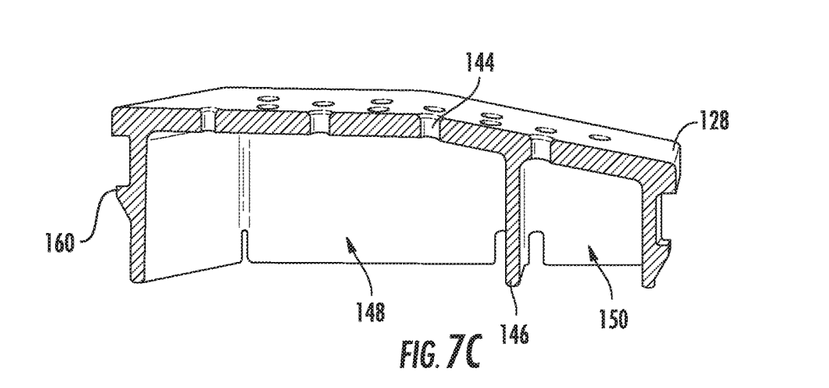
FIG. 7C is a cross-sectional view of the filter cap of FIG. 7A.

In certain embodiments, as shown in FIG. 5, the indented region 134 has a male detent 142 for snapping into a female detent or above another male detent. For example, a male detent on a filter cover (as shown in FIGS. 7A to 7C) may be set within the indented region 134 where the detent on the filter cover is held beneath the male detent 142 of the indented region 134. In other embodiments, the indented region 134 may have other suitable means for securing another object, such as a fastener (e.g., snap, bolt, or hook-and-loop).

Figure 6:
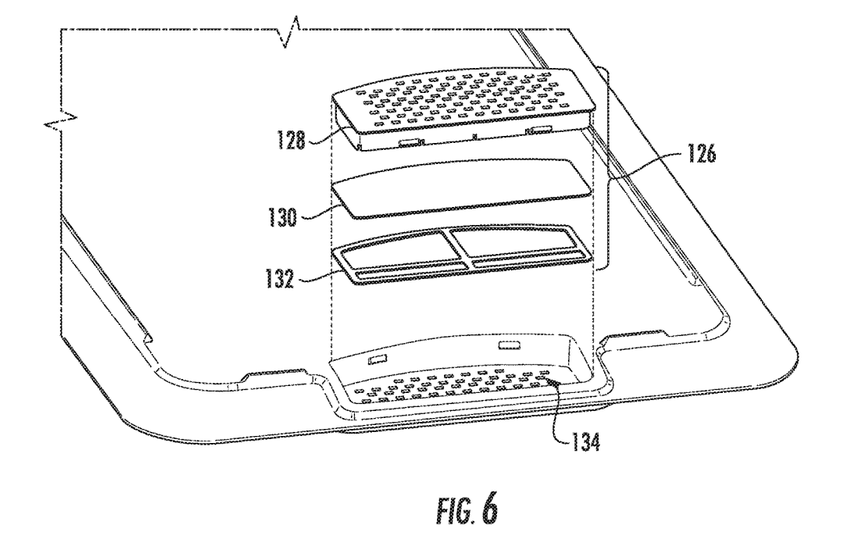
FIG. 6 is an exploded view of one embodiment of a gasket, filter, and filter cap of the container filtration system of FIG. 1.

In certain embodiments, as shown in FIG. 6, a filter system 126 may be set within the indented region 134 for regulating air flow. For example, the filter system 126 may be a combination of a filter cap 128, a filter 130, and/or a gasket 132. The gasket 132 may be the same shape as the indented region 134. In some embodiments, a filter 130 is placed on top of the gasket 132 after the gasket is set within the indented region, or the filter 130 may be bound to the gasket 132. For example, the filter 130 may be attached to the gasket by an adhesive or another fastening means. The filter 130 may regulate carbon dioxide and oxygen flow across the filter. For example, the filter 130 may be a nonwoven polyester material with or without a coating to regulate the gases coming into and out of the indented region 134. The filter 130 may have a number of other configurations, including the filter 130 being embedded into the apertures of the indented region 134 or incorporated within any number of other container filtration system 100 components. U.S. Pat. No. 7,772,139, which is incorporated by reference herein in relevant part, depicts a permeable nonwoven fabric that regulates oxygen and carbon dioxide for produce.

In certain embodiments, a filter cap 128 snaps into the indented region 134 and is configured to be easily removed. For example, the filter cap 128 may set on top of the filter 130 and gasket 132. The filter cap 128 may have a plurality of male detents 160 protruding towards the walls of the indented region 134 to temporarily bind the filter cap within the indention. In other embodiments, the filter cap 128 may permanently embed within the indented region 134. In some embodiments, as in FIGS. 7A-7C, the filter cap 128 has a plurality of apertures 144 that allow for varying amounts of liquid and gas regulation. For example, a dividing wall 146 may split the filter cap into two compartments for airflow, a first chamber 148 and a second chamber 150. For example, when the filter cap is placed within the indented region 134, depending on the size of the container, as discussed later, each chamber will vary in the amount of airflow from the storage bin. In some embodiments, the filter cap 128 has apertures on all sides. For example, the filter cap 128 may have apertures 144 on the sides of the filter cap 128 facing the walls of the indented region 134 to allow liquid to escape from above the filter 130.

Figure 8A:
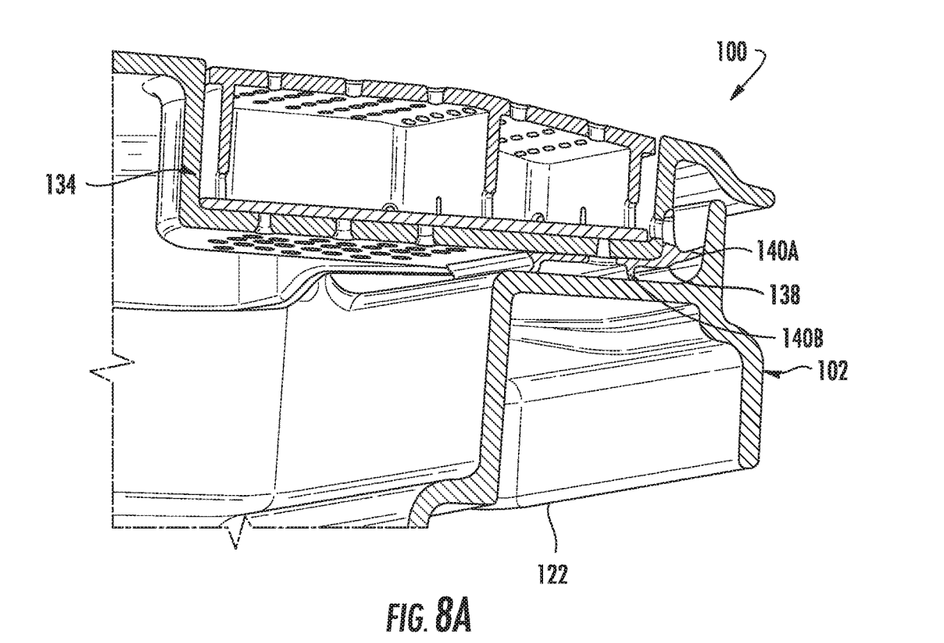
FIG. 8A is a partial perspective cross-sectional view of one embodiment of the container filtration system of FIG. 1.
Figure 8B:
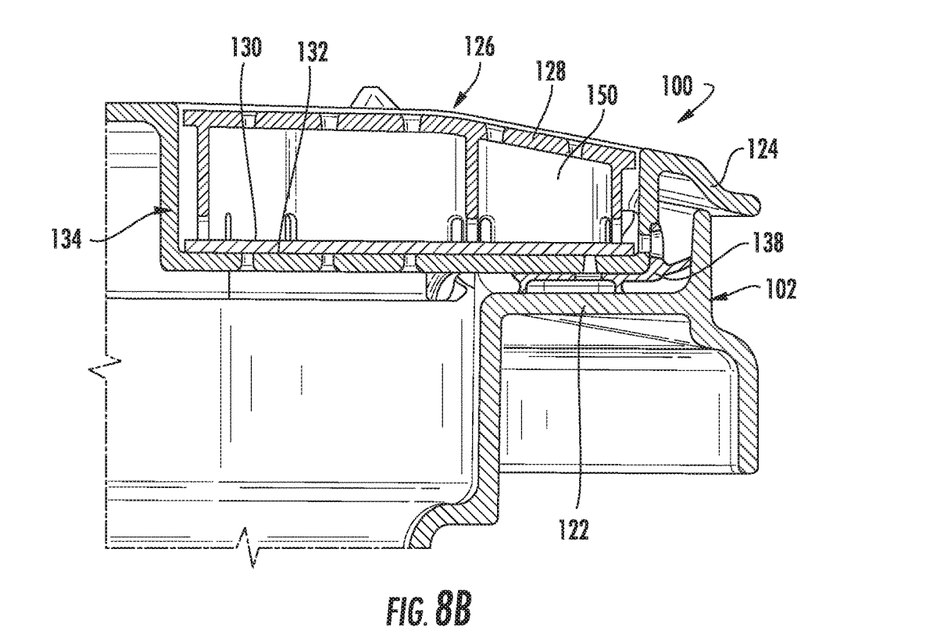
FIG. 8B is a partial cross-sectional view of one embodiment of the container filtration system of FIG. 1.

In certain embodiments, as shown in FIGS. 8A and 8B, the container filtration system 100 (i.e., the storage bin and the are configured to be associated so as to display a restricted airflow configuration. Specifically, upon mating of the lid 124 and the storage bin 102, the continuous wall 140B of the lid 124 may form a continuous seal at its periphery, against the continuous closed surface 122, to restrict gases within the storage bin from reaching the apertures encompassed by the continuous wall 140B. Thus, the continuous wall and/or continuous closed surface may be sized and shaped to provide the maximum airflow allowable by lid (i.e., through the apertures) or some amount of less airflow. In some embodiments, the lid and storage bin are designed so that the continuous wall 140B does not contact a continuous closed surface, such that all of the apertures are open to provide airflow into and out of the storage bin.

For example, the seal 138 may press against the continuous closed surface 122 formed by the storage bin 102 to restrict airflow through the filter cap 128 and into or out of the storage bin 102. For example, as seen in FIG. 8A, the first lip 140A of the seal 138 firmly slides against the storage bin 102, and the continuous wall 140B firmly presses against the continuous closed surface 122 to restrict airflow into the filter 130. For example, since the continuous wall 140B surrounds the opposite side of the indented region 134 and second chamber 150, air and liquid have been restricted to the first chamber 148 of the filter cap 128. In other embodiments, the second chamber 150 may be partially restricted. In other embodiments, the first chamber 148 may also partially or fully restrict airflow.

In certain embodiments, as in FIGS. 9A and 9B, the container filtration system 100 has little restriction of airflow within the storage bin 102. For example, no airflow from the second chamber 150 of the filter cap 128 may be restricted by the continuous closed surface 122 of the storage bin 102.

The adjustment of the airflow through the lid 124 may be determined by the size or design of the storage bin 102. One benefit to adjusting airflow is that larger containers may need more airflow to prevent spoilage whereas a smaller container may need less airflow, depending on the goods to be stored. The storage bins may have a continuous closed surface helping to reduce airflow through the lid, allowing a user to select a particular storage bin for the specific use and desired airflow into the storage bin. For example, a kit containing a single lid with various volume containers may allow for a user to select a desired level of air flow. As used herein, the term "approximately" means a measurement that is within +/− one half unit (e.g., approximately 3 gallons means 2.5-3.5 gallons).

While the disclosure has been described with reference to a number of embodiments, it will be understood by those skilled in the art that the disclosure is not limited to such disclosed embodiments. Rather, the disclosed embodiments can be modified to incorporate any number of variations, alterations, substitutions, or equivalent arrangements not described herein, but which are commensurate with the scope of the disclosure.

What is claimed is:

1. A lid for a storage container, comprising:
   a first lid face and an opposed second lid face, the second lid face comprising a rim for coupling the lid to a storage bin;
   a plurality of apertures extending between the first lid face and the second lid face, to provide an airflow path through the lid; and
   a seal material disposed on and extending from the second lid face, the seal material comprising a continuous wall surrounding a portion of the plurality of apertures, such that the airflow path at the portion of the plurality of apertures is selectively sealable at the continuous wall, when the continuous wall of the seal material contacts a continuous closed surface.

2. The lid of claim 1, wherein the seal material is disposed on and extends along the rim, such that the seal material is configured to form a seal between the lid and a storage bin to which the lid is coupled.

3. The lid of claim 1, further comprising a filter covering the plurality of apertures.

4. The lid of claim 3, further comprising a gasket disposed between the filter and the first or second lid face.

5. The lid of claim 4, further comprising a filter cap securing the filter and gasket on the first or second lid face.

6. The lid of claim 5, wherein the filter cap comprises a series of male detents configured to secure the filter cap on the first or second lid face.

7. The lid of claim 1, wherein the plurality of apertures are disposed on an indented region of the lid.

8. A container system, comprising:
   a storage bin comprising a floor, a continuous closed surface, and at least one sidewall extending from the floor to define an enclosed volume and an open top portion, wherein the open top portion is surrounded by a rim;
   a lid comprising a plurality of apertures to provide an airflow path through the lid, the lid being configured to selectively engage the storage bin at the rim to form a closed container; and
   a seal material disposed on and extending from a surface of the lid, the seal material comprising a continuous wall surrounding a portion of the plurality of apertures, such that the airflow path at the portion of the plurality of apertures is selectively sealable at the continuous wall, when the continuous wall of the seal material contacts the continuous closed surface of the storage bin.

9. The container system of claim 8, wherein the floor comprises a series of channels configured to divert liquid that contacts the floor toward the at least one sidewall.

10. The container system of claim 9, wherein the series of channels is defined by a plurality of arcuate ridges.

11. The container system of claim 8, wherein the continuous closed surface extends from the at least one sidewall.

12. The container system of claim 8, wherein the storage bin has a volume of approximately 3.5 gallons, approximately 5 gallons, approximately 8.5 gallons, or approximately 12.5 gallons.

13. The container system of claim 8, wherein the plurality of apertures are disposed on an indented region of the lid.

14. The container system of claim 13, wherein the indented region is configured to receive a gasket, a filter covering the gasket, and a filter cap, wherein the filter is disposed between the gasket and the filter cap.

15. The container system of claim 14, wherein the filter cap comprises:
   a top surface and an opposed bottom surface;
   a plurality of chambers extending from the bottom surface, wherein the plurality of chambers is configured to divide the airflow path through the lid; and a plurality of filter cap apertures extending from the top surface to the bottom surface.

16. The container system of claim 15, wherein the filter cap comprises a series of male detents configured to secure the filter cap into the indented region of the lid.

17. The container system of claim 14, wherein the filter is configured to control the flow of carbon dioxide and oxygen across the filter.

18. The container system of claim 8, wherein:
the storage bin comprises a plurality of male detents disposed opposite the open top portion; and
the lid comprises a plurality of female detents configured to receive the male detents, such that the lid is selectively attachable to a base of the storage bin.

19. A container system kit, comprising:
the lid of claim 1;
a first storage bin having a first volume and comprising an enclosed volume, the enclosed volume being defined by at least one sidewall, the at least one sidewall defining the continuous closed surface, the storage bin having an open end and a closed end, wherein the closed end defines a series of interior channels; and
a second storage bin having a second volume that is larger than the first volume and comprising an enclosed volume, the enclosed volume being defined by at least one sidewall, the second storage bin having an open end and a closed end, wherein the first and second storage bins are each configured to selectively engage the lid to form a closed container.

20. The container system kit of claim 19, wherein the first storage bin has a volume 3.5 gallons, 5 gallons, 8.5 gallons or 12 gallons, and the second storage bin has a volume of 5 gallons, 8.5 gallons, or 12.5 gallons.

\* \* \* \* \*